United States Patent
Ansiaux et al.

(10) Patent No.: US 7,948,377 B2
(45) Date of Patent: May 24, 2011

(54) SMART MEDIATION AND REACTION SYSTEM FOR PROTECTING INTERDEPENDENT CRITICAL INFRASTRUCTURES

(75) Inventors: Arnaud Ansiaux, Nozay (FR); Evren Bulut, Massy (FR)

(73) Assignee: Alcatel Lucent, Paris (FR)

( * ) Notice: Subject to any disclaimer, the term of this patent is extended or adjusted under 35 U.S.C. 154(b) by 291 days.

(21) Appl. No.: 12/211,396

(22) Filed: Sep. 16, 2008

(65) Prior Publication Data

US 2009/0079562 A1    Mar. 26, 2009

Related U.S. Application Data

(60) Provisional application No. 60/995,171, filed on Sep. 25, 2007.

(30) Foreign Application Priority Data

May 13, 2008   (EP) ..................... 08305163

(51) Int. Cl.
G08B 21/00 (2006.01)
(52) U.S. Cl. ............ 340/540; 340/3.43; 370/242

(58) Field of Classification Search ............ 340/540, 340/541, 3.1, 3.43, 3.44; 705/318, 325; 370/242, 370/241

See application file for complete search history.

(56) References Cited

U.S. PATENT DOCUMENTS

| 5,974,146 A * | 10/1999 | Randle et al. ........... 705/77 |
| 2008/0031248 A1* | 2/2008 | Vilei et al. ........... 370/390 |

\* cited by examiner

*Primary Examiner* — Toan N Pham
(74) *Attorney, Agent, or Firm* — Sughrue Mion, PLLC

(57) ABSTRACT

To monitor the functioning of the services of a first infrastructure (CI1) upon which the functioning of the critical services of a second infrastructure (CI2) depend, a server (SS) capable of communicating with both infrastructures receives, upon the detection of a failure of a service of the first infrastructure by a first terminal (CT1) included within the first infrastructure, an identifier (SI) for the faulty service sent from the first terminal. The server transmits a request to the first terminal in order to retrieve the characteristics settings values of the faulty service, and apply correlation rules to the retrieved values in order to produce information relevant to the functioning of the faulty service. The server transmits a message (SPM) containing the produced information to a second terminal (CT2) included within the second infrastructure, so that the second infrastructure can react to the failure of a service of the first infrastructure.

8 Claims, 2 Drawing Sheets

SMART MEDIATION AND REACTION SYSTEM FOR PROTECTING INTERDEPENDENT CRITICAL INFRASTRUCTURES

TECHNICAL FIELD

This invention pertains to monitoring the functioning of services that are delivered by a critical infrastructure, upon which the functioning of services from another critical infrastructure depends, a critical infrastructure being necessary for the daily life and economic activity of a community, such as an electrical network, a telecommunications network, a bank network, etc.

BACKGROUND OF THE INVENTION

The normal functioning of a community, such as an industrialized country, depends in large part upon the quality of essential services provided by critical infrastructures, such as services that provide power, telecommunications, transportation, and water distribution, for example.

These critical infrastructures exhibit new vulnerabilities, namely due to their increasing complexity, their high degree of automated control, and their interdependence. The connections between infrastructures may be physical means of spreading events that occurred in one infrastructure to another infrastructure. If a failure occurs in one infrastructure, this may lead to harmful cascading effects on other infrastructures, and create other, more dangerous failures in certain infrastructures. Due the heavily interconnected nature of these infrastructures, disturbances, failures, or even the destruction of a part of infrastructure may cause unacceptable, or even fatal, incidents.

In such cases, an insufficient understanding of the interdependence between critical infrastructures increases reaction time and the restoration of services, and sometimes makes it impossible to identify vulnerabilities and anticipate risks. In particular, coordination problems and errors often occur in crisis situations, due to the need to make decisions quickly under stressful conditions, with a multitude of unreliable and incoherent information. A misunderstanding and insufficient mastery of an infrastructure, combined with human errors, may considerably influence decision-making in crisis situations.

Currently, traditional solutions for handling a crisis situation in an infrastructure mainly consist of laying down recommendations without any true formalism, drafting a Business Continuity Plan (or BCP) and contracts regarding Service Level Agreements (or SLAs), using basic techniques for modeling and simulating interdependence between infrastructures, and using conventional communication means, such as the telephone, the fax machine, and electronic mail.

The business continuity plan defines a set for procedures and actions for an infrastructure, meant to restore acceptable functioning of a faulty essential service. The business continuity plan BCP requires that its content be maintained, deployed, and approved on a regular basis, and its operations require numerous resources. Furthermore, the business continuity plan BCP is not always up-to-date on the latest threats.

A Service Level Agreement (SLA) is a legal instrument for setting a minimum quality of service that an infrastructure delivering the service must meet. Service Level Management (SLM) tools have no role other than to control the quality of services delivered by the infrastructure. A Service Level Agreement SLA and Service Level Management SLM tools have the drawback that there is a lack of transparency and effective communication between the interdependent infrastructures. An infrastructure that is dependent on another infrastructure does not have the capability or relevant information to effectively anticipate safeguards when a service failure occurs in said other infrastructure. The infrastructure only receives insufficient reports based on metrics set forth in the Service Level Agreement SLA and generated by the Service Level Management SLM tools.

Consequently, the business continuity plan BCP and the Service Level Agreement SLA only provide static responses that are ineffective in critical situations that require a high degree of reactivity.

Other solutions consist of modeling the interdependence between critical infrastructures and drafting simulation techniques in order to analyze the impact of interruptions in services delivered by the infrastructures, and potentially to anticipate interruptions. These solutions have the drawback of being very complex, due to the intrinsic complexity of each infrastructure and the presence of multiple physical and logical connections between the infrastructures, which makes it very difficult to predict the infrastructures' behavior. Additionally, these models and simulations are mostly based on qualitative information, because a quantitative approach requires recovering data regarding the infrastructure. However, this data is not always accessible. If they are sensitive or confidential, the models will therefore insufficiently represent the infrastructures' true vulnerability.

Consequently, there is no centralized system for supervising critical infrastructures, i.e. interdependent critical infrastructures which have critical services that depend on the functioning of one or more services provided by one or more other infrastructures. There is no system with the capabilities to continuously manage this interdependence in real time and to facilitate crisis management in the event of failure in an infrastructure.

SUMMARY OF THE INVENTION

In some embodiments of the invention, there is provided a method to monitor the functioning of services of a first infrastructure upon which the functioning of critical services of a second infrastructure depends, said method comprising the following steps within a server capable of communicating with both of the infrastructures:

upon the detection of a failure of a service of the first infrastructure by a first terminal included within the first infrastructure, receiving an identifier of the faulty service sent from the first terminal, transmitting a request to the first terminal in order to retrieve characteristics settings values of the faulty service, applying correlation rules to the retrieved values to produce information related to the status of the faulty service, and transmitting a message containing produced information to a second terminal included within the second infrastructure.

The invention remedies the drawbacks of the technical art, by avoiding or minimizing the harmful effects of a failure in a critical infrastructure on other interdependent critical infrastructures.

The invention offers new capabilities for making an appropriate decision at the right time in a crisis situation. A shared communication interface and a specific communication protocol between the heterogeneous infrastructures are discloses, in order to provide information on the true functioning status of an infrastructure exhibiting a failure. This information is included in said message transmitted in due time, i.e.

neither too soon nor too late to make an appropriate decision. The message is transmitted at whatever is considered the most timely moment, based on available predetermined information and the various reaction times from the interdependent infrastructures.

Advantageously, the invention increases the general reliability and reactivity between the infrastructures, which may be critical infrastructures. The message offers any infrastructure dependent on another infrastructure a better operating view, in real time, of said other infrastructure, and of the behavior of said other infrastructure in critical situations.

The invention provides a proactive, effective, and reliable way to manage business continuity in the event of a service failure in an infrastructure, by acting as a protective interface between the infrastructures, and by establishing effective and suitable mediatory communication before, during, and after the service failure. With comprehensive, real-time monitoring, the risks of failure may be anticipated, and reaction time may be reduced, in order to avoid or minimize the harmful effects of a failure, which furthermore limits costs related to managing the failure.

Once the first message has been sent, new messages can be generated and sent over time as new values are retrieved.

In one specific embodiment of the invention, the message may be transmitted at a moment determined based on time settings values for a critical service of the second infrastructure that is dependent on the faulty service.

In one specific embodiment of the invention, the message may be transmitted at a moment that is further determined based on characteristics settings values for the faulty service.

The message may be generated and later updated up until said determined moment, before being transmitted to the second infrastructure, and other messages may then be generated and sent over time as other characteristics settings values for the faulty service are retrieved. To that end, the method of the invention may further comprise:

retrieving values of other characteristics settings of the faulty service, applying correlation rules to the retrieved values in order to produce information related to the status of the faulty service, and transmitting another message containing produced information to the second terminal included within the second infrastructure.

In one specific embodiment of the invention, the method may further comprise transmitting an alert message to the second terminal if a characteristics setting value is outside a predetermined range of values.

In one specific embodiment of the invention, the method may further comprise:

generating a dependency matrix between critical services of the second infrastructure and services of the first infrastructure, associating time settings to each of said critical services of the second infrastructure, defining settings characteristics of each service of the first infrastructure upon which a critical service of the second infrastructure depends, defining correlation rules for combining characteristics settings values of a faulty service, and saving the dependency matrix, time settings, characteristics settings, and correlation rules in a database linked to the server.

The correlation rules saved in the database represent a link established between the business continuity plan BCP and a Service Level Agreement SLA. The rules serve to trigger first actions in response to a failure being detected, and to generate protection messages for the operators of the infrastructures, who may then make more detailed and appropriate decisions.

The invention increases the feeling of safety, reliability, and availability of an infrastructure, and builds trust between the operators of infrastructures.

In one specific embodiment of the invention, the message may contain a time limit for retrieving the values of other characteristics settings.

In some other embodiments of the invention, there is provided a server for monitoring the functioning of services of a first infrastructure, upon which the functioning of critical services of a second infrastructure depends, said server being capable of communicating with both infrastructures. The server comprises:

means for receiving, upon the detection of a failure of a service of the first infrastructure by a first terminal included within the first infrastructure, an identifier of the faulty service sent from the first terminal, means for transmitting a request to the first terminal in order to retrieve characteristics settings values of the faulty service, means for applying correlation rules to the retrieved values, in order to produce information related to the status of the faulty service, and means for transmitting a message containing the produced information to a second terminal included within the second infrastructure.

BRIEF DESCRIPTION OF THE DRAWINGS

The present invention and the benefits thereof shall be better understood from the reading of the description below, which makes reference to the attached figures, in which.

DETAILED DESCRIPTION

As a foreword, a few terms and concepts that are helpful for understanding the invention are defined below.

An infrastructure is a set of interconnected structural elements that provide the framework for bearing the entire structure. A critical infrastructure corresponds to a basic installation needed for the daily life and economic activity of a community, such as a State. Critical infrastructures may, for example, be related to a telecommunication network, an electrical network, a transportation network, a banking network, or an emergency services network.

A failure in a critical infrastructure is one that may lead to the destabilization of the proper business operations of the community. For example, a failure may be a breakdown, or an incident such as an attack on the critical infrastructure.

For example, a blackout in the electrical network may destabilize the functioning of the telecommunication network, which makes emergency services unavailable.

Each critical infrastructure offers critical services to the community. A service is deemed critical if, for example, it is essential to the good working order of the critical infrastructure, or if its delivery is a quality safeguard handled by the critical infrastructure. Furthermore, each infrastructure delivers at least one service to at least one other dependent critical infrastructure, the service delivered by said critical infrastructure potentially being necessary for the functioning of a critical service of said other dependent critical infrastructure.

Figure 1:
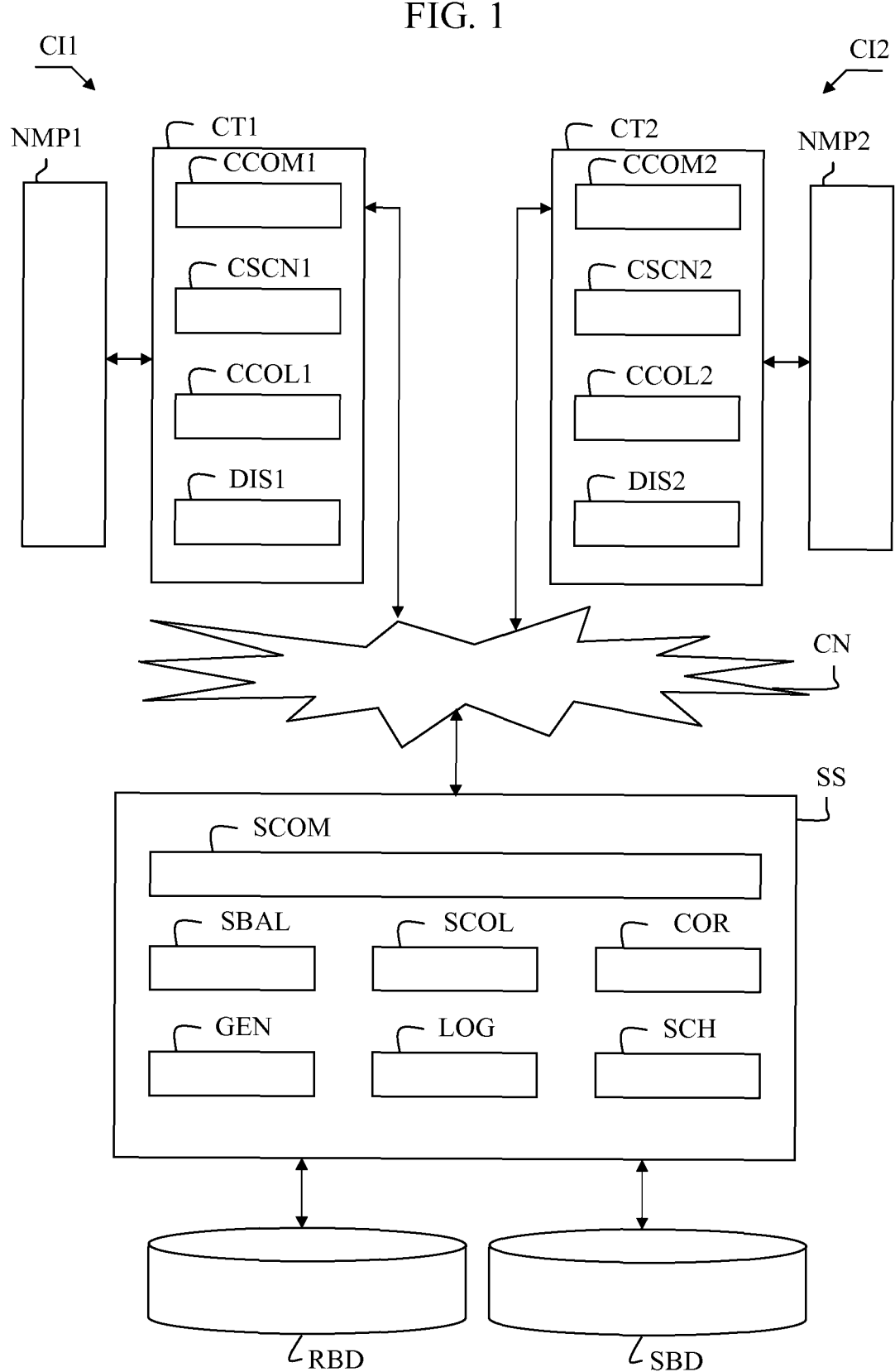
FIG. 1 is a schematic block diagram of a monitoring system and two interdependent critical infrastructures according to the invention.

In FIG. 1, a monitoring system according to one embodiment of the invention comprises a communication network CN, a security server SS, and at least first and second client terminals CT1 and CT2, respectively integrated into first and second critical infrastructures CI1 and CI2.

The communication network CN connects the security server SS and the two client terminals CT1 and CT2 by wired or wireless connections. For example, the communication network CN may be an IP packet network with wired connections, or a radio wave network. The communication network CN may be restricted to a basic link between the security server SS and each client terminal. A communication network CN is considered to be an independent entity specific to the infrastructures that are being monitored by the security server.

In the remainder of the description, the security server SS is an entity outside the infrastructures, and is connected to two client terminals CT1 and CT2 respectively associated with the distinct first and second critical infrastructures, the second infrastructure CI2 being dependent on the first infrastructure CI1.

In one variant, the security server SS may be included within one of the two infrastructures.

The security server SS comprises a communication server module SCOM, a service-scanning server module SSCN, a collection server module SCOL, a correlation module COR, a message generation module GEN, a log module LOG, and a scheduling module SCH.

The security server SS is linked to a rules database RDB and to a storage database SDB, which are each integrate within said server SS or incorporated into a database management server linked to the server SS by a remote or local connection.

The rules database RDB comprises information related to the invention, such as correlation rules for generating messages to be transmitted to a critical infrastructure. The storage database SDB comprises files in which events related to processing a failure of a service in an infrastructure are stored.

In the remainder of the description referring to FIG. 1, the term "client terminal" may designate either of the two client terminals CT1 and CT2, and references with the extension "1" correspond to the first client terminal CT1, while references with the extension "2" correspond to the second client terminal CT2.

The client terminal CT1, CT2 comprises a communication client module CCOM1, CCOM2, a service-scanning client module CSCN1, CSCN2, a collection client module CCOL1, CCOL2, and a message displaying module DIS1, DIS2. The client terminal CT1, CT2 is linked to a network management platform NMP1, NMP2 which manages the functioning and providing of services for the critical infrastructure.

The monitoring server SS is considered to first communicate with the first client terminal CT1 to monitor the first infrastructure, and secondly communicate with the second terminal CT2 in order to alert the second infrastructure.

The server communication module ensures secure communication with the client communication module CCOM1, CCOM2. Said secure communication may be wired or wireless.

The server service-scanning module SSCN retrieves all the identifiers for the services to scan from the rules database RDB when the monitoring system is stated up, and transmits these identifiers to the client service-scanning module CSCN1 of the first infrastructure. The module SSCN is then monitoring the client module CSCN1 on a permanent or regular basis. When a failure in service is detected by the client module CSCN1, the server module SSCN receives an identifier of the faulty service. The server module SSCN activates the server collection module SCOL, the log module LOG, and the scheduling module SCH to process the identified service.

The server collection module SCOL retrieves the settings of the faulty service from the rules database RDB, based on the identifier of the faulty service. The module SCOL transmits requests to the client collection module CCOL1 to obtain the values of these settings. Once all the values have been retrieved, the module SCOL transmits these values to the correlation module COR.

The correlation module COR established a correlation between all of the retrieved values, based on rules saved in the rules database RDB. The module COR transmits all relevant details about the settings, or coherent enriched information, to the message generation module GEN so that a smart protection message can be generated.

The message generation module GEN generates a smart protection message based on the information received from the correlation module COR, and transmits this message to the message display module DIS2 of the second infrastructure.

The log module LOG writes all of the log information regarding the period between the beginning and end of a service failure into the storage database SDB. Furthermore, all of the exchange information, such a settings values and protection messages, are saved in a structured format in the database SDB.

The scheduling module SCH determines the best time to transmit the smart protection messages and urgent messages to the message display module DIS2, based on the various time values related to the critical services and scanned services, and on the preset thresholds. The module SCH schedules the transmission of the messages to resolve the failure of service. Furthermore, the module SCH can verify a time limit to obtain settings values from a client collection module CCOL1.

The modules of client terminal CT1 have features that complement the modules of the security server SS.

The client communication module CCOM1, CCOM2 handles secure communication with the server communication module SCOM.

The client service-scanning module CSCN1, CSCN2 continuously or regularly checks the status of all services upon which a critical service depends, from the network management platform NMP1, NMP2. When a failure of service is detected, the client service-scanning module alerts the server service-scanning module SSCN.

The client collection module CCOL1, CCOL2 receives requests sent from the server collection module SCOL to retrieve all available values for settings of the faulty service. The retrieval of values is initiated by the server module SCOL, which receives the requested information about the services to be scanned from the client collection module.

The message display module DIS1, DIS2 receives the smart protection message in a format that is specific to the monitoring system, and converts the message into a format that can be interpreted by the network management platform NMP1, NMP2.

In one variant, the client modules are distributed among multiple terminals that communicate with one another within a single infrastructure.

It is assumed that the interactions between the service server SS and the client terminals CT1 and CT2 are symmetrical, with the server SS being able to monitor the second infrastructure and alert the first infrastructure of any detected failure of a service of the second infrastructure.

It is also assumed that the service server SS of the invention can monitor the functioning of the services of multiple critical infrastructures, in particular the functioning of services of a critical infrastructure upon which multiple other critical infrastructures depend.

Figure 2:
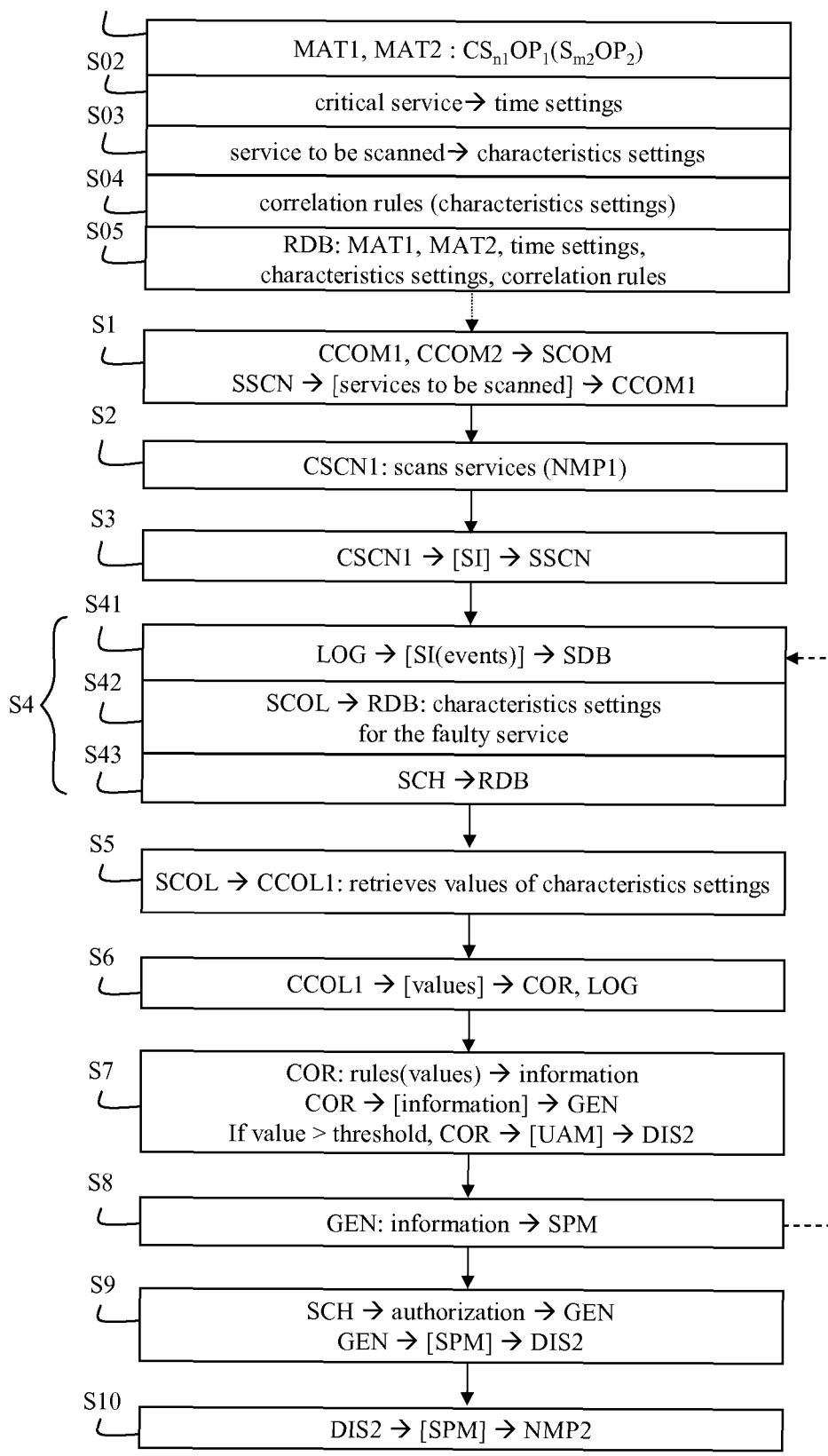
FIG. 2 is a monitoring method algorithm for two interdependent critical infrastructures according to the invention.

In FIG. 2, the monitoring method according to one embodiment of the invention comprises steps S1 to S10, which are automatically executed in the monitoring system of the invention, preceded by preliminary steps S01 to S05.

The method is described above with respect to a monitoring server which is communicating with first and second critical interdependent infrastructures, and which checks the functioning status of the first infrastructure in order to alert the second infrastructure of any failure detected in the first infrastructure.

The preliminary steps S01 to S05 correspond to cooperative efforts between the operators of the first and second infrastructures in order to generate and set rules, such as by a contract SLA on service level agreements, a business continuity plan BCP, and a risk assessment. These rules are defined in tables and matrices stored in the rules database RDB. The operator of an infrastructure is assumed to be a company in charge of ensuring the functioning of the infrastructure.

The operators of the first and second infrastructures are respectively designated the "first operator" $OP_1$ and "second operator" $OP_2$. Each infrastructure delivers which are either critical or non-critical. It is assumed that the first and second infrastructures respectively have $M_1$ services $S_{m1}OP_1$, with $1 \leq m1 \leq M_1$, and $M_2$ services $S_{m2}OP_2$, with $1 \leq m2 \leq M_2$, and respectively have $N_1$ critical services $CS_{n1}OP_1$, with $1 \leq n1 \leq N_1$, and $N_2$ critical services $CS_{n2}OP_2$, with $1 \leq n2 \leq N_2$.

In the preliminary step S01, the operator of the first critical infrastructure CI1 or the second critical infrastructure CI2, defines a dependency relationship for each critical service in critical infrastructure with services, whether critical or non-critical, in the second infrastructure or first infrastructure, respectively. The services of the second infrastructure associated with a critical service are necessary for the good working order of the critical service, and will then be monitored by the server and client scanning modules. In the remainder of the description, such services are designated "services to be scanned".

For example, the dependency relationship may be defined following a risk analysis that leads to the determination of critical services, countermeasures, and emergency procedures that are described in multiple documents, including the business continuity plan BCP, for example.

The operator then generates a matrix describing this previously defined dependency relationship. For example, the operator of the first infrastructure may generate a matrix MAT1 in the following shape:

| MAT1 | $OP_2$ | | | | |
|---|---|---|---|---|---|
| | $S_1OP_2$ | ... | $S_{m2}OP_2$ | ... | $S_{M2}OP_2$ |
| $OP_1$ | $CS_1OP_1$ | x | | | x |
| | ... | | | | |
| | $CS_{n1}OP_1$ | | x | | |
| | ... | | | | |
| | $CS_{N1}OP_1$ | x | | | |

The first critical service $CS_1OP_1$ of the first operator $OP_1$ depends on the services $S_1OP_2$ and $S_{M2}OP_2$ of the second operator $OP_2$, while the last critical service $CS_{N1}OP_1$ of the first operator $OP_1$ depends only on the service $S_1OP_2$ of the second operator $OP_2$.

In another example, the operator of the second infrastructure generates a matrix MAT2 in the following shape:

| MAT2 | $OP_1$ | | | | |
|---|---|---|---|---|---|
| | $S_1OP_1$ | ... | $S_{m1}OP_1$ | ... | $S_{M1}OP_1$ |
| $OP_2$ | $CS_1OP_2$ | x | | | |
| | ... | | | | |
| | $CS_{n2}OP_2$ | | | | x |
| | ... | | | | |
| | $CS_{N2}OP_2$ | x | | | x |

The first critical service $CS_1OP_1$ of the first operator $OP_1$ depends only on the last service $S_{M1}OP_1$ of the second operator $OP_2$.

In the event that multiple infrastructures are to be monitored, each infrastructure operator defines a dependency relationship for each critical service in the infrastructure, with services, whether critical or non-critical, for each of the other infrastructures upon which said infrastructure depends.

In step S02, the operators of both infrastructures CI1, CI2 associate each critical service with a list of time settings used for determining the best moment for sending a protection message to an infrastructure. Each operator further defines metrics and thresholds for each of the critical services.

By way of example, one time setting might be a time limit beyond which a predefined threshold may be exceeded, or a permitted interval of time during which the critical service is not performed.

In step S03, the operators of both infrastructures CI1, CI2 define characteristics settings for each service to be scanned. These characteristics settings are defined so as to be dependent on one another, and to make correlations between the values of these settings, and may relate to time data. The purpose of these correlations is to provide coherent enriched information in the event that the service to be scanned fails, with this information enabling the infrastructure that is dependent on the faulty service to react with as much relevant information as possible about the actual working status of the faulty service.

For example, one characteristics setting is also a time limit beyond which a predefined threshold may be exceeded.

Furthermore, one characteristics setting may be a time limit for retrieving values of certain settings.

The services' time and characteristics settings, as well as the thresholds defined in steps S02 and S03 may, for example, be obtained upon entering into a contract SLA regarding service level agreements between the operators of the first and second infrastructures, enabling the continuity and availability of their interdependent services.

In step S04, the operators of both infrastructures define a correlation rules table that combines the settings values of various services, in order to obtain coherent enriched information. This information offers a contextual view of the true working status of the infrastructure being monitored.

In step S05, the dependency matrices, the list of time settings for critical services, the characteristics settings of the services to be scanned, and the correlation rules tables are transmitted to the monitoring server, which saves them in a rules database RDB.

The preliminary steps S01 to S05 are executed off-line, i.e. without it being necessary for the client terminals and the monitoring server to communicate. For example, the infrastructures' operators may transmit the correlation rules tables to a service server administrator, who then integrates these tables into the rules database RDB. Upon the completion of steps S01 to S05, the monitoring server has, within the rules database RDB, all of the information needed to monitor the infrastructures.

The following steps S1 to S10 are then executed "online," i.e. by the monitoring server and each of the client terminals that are communicating with the monitoring server. All communications and transmissions of data between one of the client terminals and the monitoring server are handled by the client communication module of the client terminal and the server communication module of the monitoring server. As a reminder, the method is described below for monitoring the operational status of the first infrastructure in order to alert the second infrastructure of any failure detected in the first infrastructure.

In step S1, the client communication modules CCOM1 and CCOM2 of the client terminals CT1 and CT2, respectively, connect to the server communication module SCOM of the monitoring server SS. The server scanning module SSCN determines a list of services to be scanned in both infrastructures, based on information stored in the rules database RDB. The server scanning module SSCN transmits the list of identifiers for the services to be scanned in the first infrastructure to the client module CCOM1, and the list of services to be scanned in the second infrastructure to the client module CCOM2.

In step S2, the client scanning module SSCN1 of the client terminal CT1 continuously or regularly scans all services in the first infrastructure whose identifiers were transmitted in the list by the server module SSCN. In the example given, the client module CSCN1 performs operational analyses on one services at detection points in the first infrastructure via the network management platform NMP1.

In step S3, whenever the client scanning module CSCN1 detects a service failure, the module CSCN1 transmits an identifier SI for the faulty service to the server scanning module SSCN.

In step S4, the log module LOG, the collection module SCOL, and the scheduling module SCH are activated, such as by the server scanning module SSCN, and simultaneously execute operations according to sub-steps S41 to S43.

In sub-step S41, the log module LOG is paying attention to all events related to the detected service failure. These events may, for example, be saved in a file in the storage database SDB, associated with an identifier SI for the faulty service.

In sub-step S42, the server collection module SCOL queries the rules database RDB to obtain all of the characteristics settings of the faulty service, such as by using the identifier SI of the faulty service.

In sub-step S43, the scheduling module SCH queries the rules database RDB to obtain all time values regarding the parameters that pertain to critical services in the second infrastructure to and services to be scanned in the first infrastructure. The module SCH contains an algorithm to determine the best time to transmit a first smart protection message SPM to the second infrastructure. Furthermore, the module SCH begins regulating all data transmissions between the monitoring server and each of the client terminals.

In step S5, the server collection module transmits a request to the client collection module CCOL1, which, upon receiving the request, retrieves all values of characteristics settings for the faulty service, cooperating with the network management platform NMP1 of the first infrastructure. These values may be retrieved automatically or manually, or part automatically and part manually. For example, the request may contain all characteristics settings of the faulty service obtained in sub-step S42, and a command for the client module CCOL1 to enter the characteristics settings.

In step S6, the client collection module CCOL1 transmits a response containing all the values retrieved to the server collection module SCOL, which retransmits these values to the correlation module COR and to the log module LOG.

In step E7, the correlation module COR analyzes correlation rules saved in the rules database RDB in order to apply these rules to the settings filled in by the retrieved values.

The correlation module COR produces coherent enriched information following an analysis of the settings values based on the correlation rules. The correlation module COR transmits this produced information to the message generation module GEN.

Furthermore, the correlation module COR checks whether settings values meet the respective predefined thresholds, if any such thresholds exist. If at least one parameter value does not meet a respective threshold, the correlation module COR orders that an urgent alert message UAM saved in the rules database RDB be automatically transmitted to the display module DIS2 of the second infrastructure. Generally speaking, the alert message UAM is transmitted if at least one settings value is outside a predetermined range of values. The urgent alert message UAM may, for example contain basic information on the failure detected, in order to warn the second infrastructure of that failure as soon as possible.

In step S8, the message generation module GEN receives the information produced by the correlation module COR and integrates this information into a smart protection message SPM, which is in a format that is in a format that can be interpreted by the client terminal CT2 of the second infrastructure.

Steps S4 to S8 may be repeated, under the control of the scheduling module SCH, until some of these characteristics settings of the faulty service are entered by the first client terminal CT1.

In step S9, the message generation module GEN waits for authorization from the module to transmit any data to one of the client terminals. For example, the module SCH checks the information produced by the module GEN and determines the best time for transmitting the message SPM based on a predefined algorithm that, in particular, takes into account time settings values of the critical service of the second infrastructure. The selected best time may correspond to the moment when the operator of the second infrastructure may make suitable decisions with awareness of the cause to anticipate the consequences of the failure of the critical services delivered by the second infrastructure.

The message SPM is updated regularly based on the values of the characteristics settings of the faulty service that are transmitted over time by the first client terminal, during steps S4 to S8, which may potentially be repeated. The message SPM is saved and updated until a critical time limit, which corresponds to the best time for transmitting the SPM message, expires.

For example, the critical time limit may be found in a rules database RDB and correspond to a time parameter associated with the critical service defined in the preliminary step S02. In another example, the critical time limit is determined based on a predefined algorithm that takes into account time settings values of the critical service in the second infrastructure and characteristics settings values of the faulty service in the first infrastructure.

The message SPM is to be transmitted when it contains a sufficient amount of relevant information for the second infrastructure to be able to react effectively to the detected service failure.

The message SPM may not be transmitted to soon, i.e. before it contains said sufficient amount of relevant information, so as not to overload the second infrastructure with barely coherent information, and keep the second infrastructure from making unhelpful decisions. For example, before the expiration of the critical deadline, the first client terminal CT1 may potentially inform the monitoring server that the faulty service has been repaired, or that the faulty service will be repaired within a given period of time.

Furthermore, the message SPM may not be transmitted too late, i.e. after a moment beyond which the second infrastructure will no longer have enough time to react effectively to keep the service failure from having harmful consequences on the operation of a critical service.

By way of example, the first and second critical infrastructures are, respectively, an electrical network and a telecommunication network. The telecommunication network delivers a critical service using a router which is powered by a power line from the electrical network, which provides a specific electrical power service on that power line. The router contains a battery which has a duration equal to "two hours," said duration being saved as a time setting of the critical service in the rules database RDB. If the failure is an interruption in power, and if a time value of the faulty service related to estimate the repair of the interruption has a value equal to "three hours", the message SPM may be transmitted as soon as this value is received by the monitoring server. If this value is equal to "one hour", the message SPM is not transmitted, because the failure will have no critical consequences on the functioning of the router.

Whenever the module SCH authorizes the transmission to the module GEN, the message generation module GEN transmits the smart protection message SPM to the display module DIS2 of the second infrastructure. Furthermore, the module GEN also transmits the message SMP to the log module LOG so that the log module can save the message SPM into the storage database SDB.

In step S10, the display module DIS2 receives the smart protection message SPM and converts it into a format that can be interpreted by the network management platform NMP2 of the second infrastructure.

The information contained within the message SPM enables the operator of the second infrastructure to react as well as possible to the detected service failure in the first infrastructure. This information is relevant information on the actual functioning status of the faulty service. For example, the message SPM may contain a minimum amount of information needed to take suitable countermeasures so that the detected service failure in the first infrastructure does not affect the functioning of the critical services in the second infrastructure.

For example, if the first and second infrastructures are, respectively, an electrical network and a transportation network, the message SPM may contain information that in particular relates to a gradual decrease in voltage observed on a high-voltage power line, indicating that the voltage will be below a predefined threshold within a set period of time, with the predefined threshold corresponding to a minimum voltage for powering part of the transportation network. The message SPM thereby warns the transportation network of this observed failure, with relevant information.

In another example, the message SPM might not contain all the information needed for the second infrastructure to react to the failure detected, with some information being unavailable, such as because some values could not be obtained to fill in certain parameters. If so, the message SPM may further contain a piece of information indicating that a setting is unavailable and will be filled out within a given period of time. This message SPM, though incomplete, alerts the second infrastructure of a failure detected with some relevant information, with the second infrastructure already being capable of initiating countermeasures as it waits to receive the remaining relevant information.

Steps S2 to S10 are repeated cyclically in a regulated manner by the scheduling module SCH for as long as the detected service failure has not been fully resolved or considered resolved.

For example, if a smart protection message SPM is incompletely received by the second infrastructure, this infrastructure receives at least one other message SPM containing the awaited relevant information. In such a case, the service server SS retrieves the values of other characteristics settings of the faulty service, applies correlation rules to the retrieved values to produce other information related to the status of the faulty service, and to transmit another message containing the information produced to the second terminal CT2 of the second infrastructure CI2.

When processing a failure in a critical infrastructure, each smart protection message SPM is saved in the storage database SDB in order to update the correlation rules using feedback, and to create a log file to assist in possible dispute between the operators of the interdependent critical infrastructures.

As a non-limiting example, two interdependent infrastructures, an electrical network, and a telecommunication network, are considered.

The telecommunication network delivers a critical service, to with a billing service. A failure of this service may potentially have drastic economic consequences for the operator of the telecommunication network.

The devices of the telecommunication network that handle the functioning of the billing service are electrically powered by the operator that manages the electrical network. The electrical network therefore delivers an electrical power service upon which the functioning of the billing service depends.

Generally, protection mechanisms, such as a backup power supply, are provided for such critical devices in the event that power is cut. However, if the power is cut for an extended period of time, these mechanisms may not be sufficiently sized to cover the duration of the failure or the amount of power required.

The invention enables the operator of the telecommunication network to get real-time information on the status of the electrical network and, if any problem arises, specific information on that status and its return to normal, with the telecommunications operator then being able to take suitable protective measures.

The operator of the telecommunication network can avail itself of time settings related to the critical service, such as the endurance time of the various backup power supplies, or the period of time needed to shift billing to other devices in another location which handle the same service and are still functioning. The operator of the telecommunication network can further avail itself of metrics and thresholds related to the critical service, such as power thresholds for the functioning of the devices that handle the critical service and the power specifications of these devices.

For the operator of the telecommunication network to be able to anticipate backup procedures following a failure, the operator of the electrical network may transmit to the security server characteristics settings values for the faulty electrical power service. Such values may, for example, pertain to the predefined voltage thresholds being reached, and a wait period that will pass before the service's good working order may be restored.

As soon as a failure occurs, the security server may thereby provide the telecommunication network with messages containing information related to the status of the faulty service, such as updated wait periods for restoring the faulty power service. A wait period may be the sum of the time needed for services or repairs, which the operator of the electrical network may assess and fill out in real time. Furthermore, messages are provided to the telecommunication network as a function of time settings related to the critical service, at a moment considered to be best for making a suitable decision when faced with the failure.

The invention claimed is:

1. A method for monitoring the functioning of services in a first infrastructure upon which the functioning of critical services of a second infrastructure depends, said method comprising the following steps within a server capable of communicating with both infrastructures:
   upon the detection of a failure of a service of the first infrastructure by a first terminal included within the first infrastructure, receiving an identifier of the faulty service sent from the first terminal,
   transmitting a request to the first terminal in order to retrieve characteristics settings values of the faulty service,
   applying correlation rules to the retrieved values to produce information related to a status of the faulty service, and
   transmitting a message containing the produced information to a second terminal included within the second infrastructure.

2. The method in accordance with claim 1, in which the message is transmitted at a given moment based on time settings values for a critical service in the second infrastructure that depends on the faulty service.

3. The method in accordance with claim 1, in which the message is transmitted at a given moment that is further based on characteristics settings values for the faulty service.

4. The method in accordance with claim 1, further comprising transmitting an alert message to the second terminal if a characteristics setting value is outside a range of predetermined values.

5. The method in accordance with claim 1, further comprising:
   retrieving values of other characteristics settings of the faulty service,
   applying correlation rules to the retrieved values in order to produce information related to the status of the faulty service, and
   transmitting another message containing produced information to the second terminal included within the second infrastructure.

6. The method in accordance with claim 1, in which the message contains a time limit for retrieving the values of other characteristics settings.

7. The method in accordance with claim 1, further comprising:
   generating a matrix showing dependencies between critical services of the second infrastructure and services of the first infrastructure,
   associating time settings to each of said critical services of the second infrastructure,
   defining settings characteristics of each service of the first infrastructure upon which a critical service in the second infrastructure depends,
   defining correlation rules for combining characteristics settings values of a faulty service, and
   saving the dependency matrix, time settings, characteristics settings, and correlation rules into a database linked to the server.

8. A server for monitoring the functioning of services of a first infrastructure upon which the function of critical services of a second infrastructure depends, the server being capable of communicating with both infrastructures, said server comprising:
   means for receiving, upon a detection of a failure of a service of the first infrastructure by a first terminal included within the first infrastructure, an identifier of the faulty service sent from the first terminal,
   means for transmitting a request to the first terminal in order to retrieve characteristics settings values of the faulty service,
   means for applying correlation rules to the retrieved values, in order to produce information related to the status of the faulty service, and
   means for transmitting a message containing the produced information to a second terminal included within the second infrastructure.

* * * * *